Patented June 8, 1948

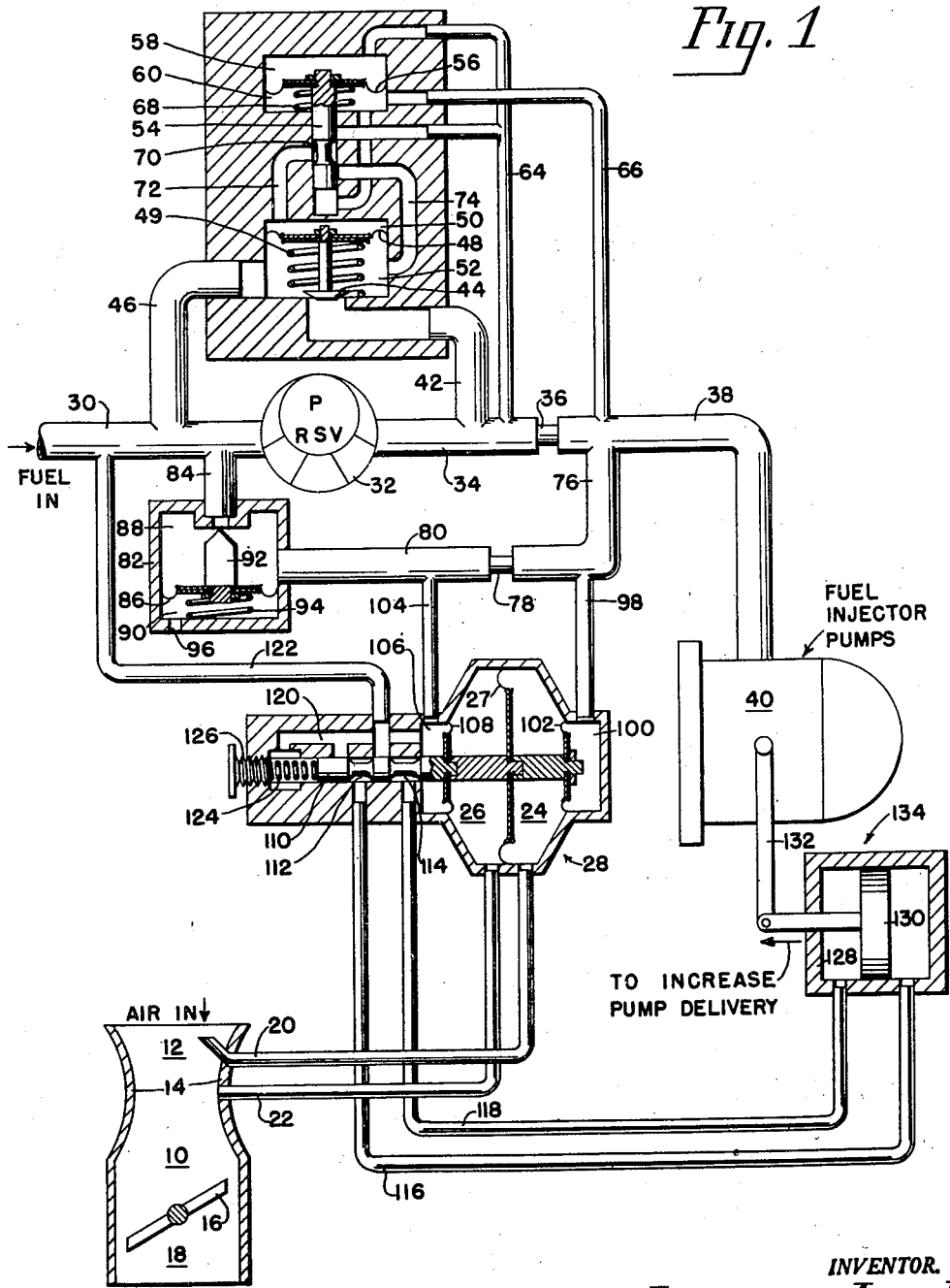

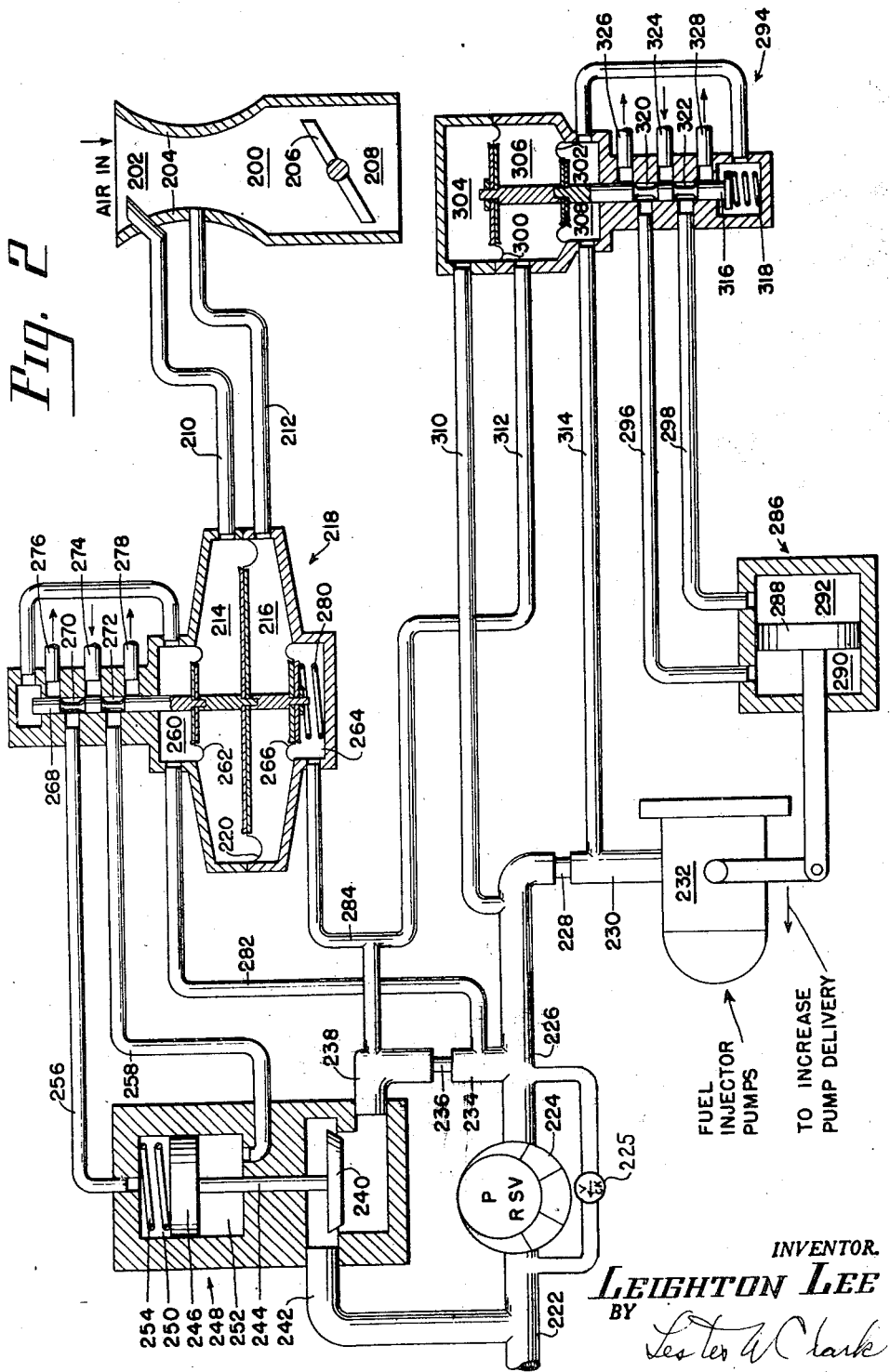

2,442,954

UNITED STATES PATENT OFFICE 2,442,954

CONTROL APPARATUS FOR INTERNAL-COMBUSTION ENGINES

Leighton Lee, II, Rocky Hill, Conn., assignor, by mesne assignments, to Niles-Bement-Pond Company, West Hartford, Conn., a corporation of New Jersey Application November 29, 1946, Serial No. 713,179

10 Claims. (Cl. 123—119)

The present invention relates to control apparatus for internal combustion engines, and particularly to apparatus for regulating the flow of fuel to such engines.

In modern aircraft engines, the most common method of controlling the fuel flow is to provide some means for measuring the flow of combustion air to the engine, means for measuring the flow of fuel to the engine, and a device responsive to the balance between these two measurements for regulating the fuel flow so as to maintain that balance. In that way, a substantially constant fuel-air ratio is secured.

Such systems commonly employ a venturi for measuring the air flow and one or more fuel metering orifices for measuring the fuel flow. If the air venturi and the fuel metering orifice are to have sufficient capacity to handle the maximum required fuel and air flows, then the air and fuel pressure differentials at these flow measuring mechanisms are so small when the engine is idling as to be measurable only with difficulty. For that reason, it is customary to provide a throttle operated valve or other suitable means for controlling the fuel flow under idling conditions, which does not depend upon the air pressure differential at the venturi.

It is therefore an object of the present invention to provide improved fuel flow control apparatus for an internal combustion engine which will be equally effective over the entire range of air and fuel flows, and which will not require additional mechanisms for controlling the fuel flow under idling conditions.

Another object is to provide a fuel flow control system for an internal combustion engine wherein the fuel flow measuring forces are large and readily measurable quantities over the entire range of operation of the engine.

A further object is to provide a fuel supply system for an internal combustion engine including a fuel transfer pump having one discharge conduit leading to the engine and a second discharge conduit leading to the pump inlet, and where the total fuel discharged by the pump is maintained substantially constant, and the difference between that total fuel flow and the fuel flow in the second discharge conduit is utilized as a measure of the flow of fuel to the engine.

Other objects and advantages of the present invention will become apparent from a consideration of the appended specification, claims and drawings, in which Figure 1 illustrates, somewhat diagrammatically, a fuel supply system for an internal combustion engine embodying the principles of my invention, and Figure 2 shows a modified form of the fuel supply system embodying the principles of my invention.

Figure 1

Referring to the drawing, there is shown a passage 10 for combustion air going to the engine. This passage extends from an entrance 12, past a venturi 14, and a throttle 16, to a discharge outlet 18.

The air pressure differential set up by the venturi 14, which is a measure of the volumetric rate of flow of air to the engine, is communicated through a pair of conduits 20 and 22 to a pair of expansible chambers 24 and 26, respectively, located in a pilot valve mechanism generally indicated at 28. Chambers 24 and 26 are separated by a flexible diaphragm 27.

If desired, the air pressure differential between chambers 24 and 26 may be compensated for variations in density of the air flowing through the passage 10, so that it represents a measure of the mass rate of flow of air to the engine, rather than the volumetric rate of flow. Suitable density compensating means are shown in the patent to Milton E. Chandler, No. 2,393,144, issued January 15, 1946.

Fuel for the engine comes from a tank (not shown) and passes thru a conduit 30, an engine driven transfer pump 32, a conduit 34, a metering restriction 36, and a conduit 38 to a set of fuel injector pumps schematically indicated at 40. Any suitable type of fuel injector pump may be used, for example, the type shown in the copending application of George W. Baierlein, Serial No. 650,408, filed February 27, 1946.

A first pressure relief conduit extends from a conduit 34 at the upstream side of restriction 36 through a conduit 42, a valve 44, and a conduit 46 to the pump inlet conduit 30. The valve 44 is positioned by a flexible diaphragm 48, which separates a pair of expansible chambers 50 and 52.

The valve 44 is controlled so as to maintain a constant pressure drop across the metering orifice 36, and hence a constant rate of fuel flow through that metering orifice. This control is accomplished by controlling the pressure in the chamber 50 by means of a pilot valve 54.

Pilot valve 54 is attached to and positioned by a flexible diaphragm 56, which separates a pair of expansible chambers 58 and 60. Chamber 58 is connected through conduit 64 to the conduit 34 on the upstream side of restriction 36. Chamber 60 is connected through conduit 66 to conduit 38 on the downstream side of restriction 36. The pressure differential across the restriction 36 therefore acts downwardly on the diaphragm 56. This pressure differential is opposed by a spring 68.

Valve 54 is a spool valve and is provided with a recess 70 aligned with a port which leads through a passage 72 to the chamber 50 above the diaphragm 48. On either side of the recess 70, the valve 54 is provided with lands which block ports leading to the conduit 64 and to a conduit 74 which communicates with the chamber 52 below diaphragm 48. The pressure in conduit 64 is relatively high, being substantially the discharge pressure of the pump 32. The pressure in chamber 52 and conduit 74 is relatively low, being substantially the pressure at the inlet of pump 32. As long as the valve 54 remains in the position shown in the drawing, neither conduit 64 nor 74 is connected to conduit 72 and chamber 50. The chamber 50 therefore neither expands nor contracts, and the valve 44 remains in the position shown in the drawing.

If the fuel pressure differential increases, diaphragm 56 and valve 54 are moved downwardly against the force of spring 58, connecting conduits 72 through recess 70 with the conduit 74 leading to the low pressure chamber 52. The spring 49 thereupon moves the diaphragm 48 upwardly to collapse the chamber 50. This opens valve 44 so as to increase the flow through the conduit 42, thereby decreasing the flow through metering restriction 36. This movement of valve 44 continues until the pressure differential across restriction 36 has decreased sufficiently so that spring 68 moves valve 54 back to its neutral position.

If the pressure differential across restriction 36 falls below the value determined by spring 68, then the spring 68 moves diaphragm 56 upwardly, opening a passage from high pressure conduit 64 through recess 70 into conduit 72, thereby supplying high pressure fluid to the chamber 50 above diaphragm 48. This moves valve 44 in a closing direction thereby decreasing the flow through conduit 42 and increasing the flow through restriction 36 until the fuel pressure differential across it is restored to its previous value, whereupon the valve 54 is again closed.

It may therefore be seen that pilot valve 54 and valve 44 together control the fuel flow through metering restriction 36 so as to make that fuel flow substantially constant. The particular constant value of the fuel flow is determined by the strength of spring 68. The spring is preferably chosen so that the fuel flow through restriction 36 is the maximum fuel flow required by the engine under conditions of maximum power output.

Another pressure relief conduit extends from conduit 38 on the downstream side of restriction 36 through a conduit 76, a fixed restriction 78, a conduit 80, a pressure regulator generally indicated at 82, and a conduit 84 to the fuel inlet conduit 30.

The pressure regulator 82 has a diaphragm 86 separating a pair of expansible chambers 88 and 90. The diaphragm 86 carries a valve 92 which co-operates with a port leading to conduit 84. A spring 94 biases the diaphragm 86 and valve 92 in a valve closing direction. The conduit 80 is connected to chamber 88. The chamber 90 is vented at 96 to the atmosphere.

The conduit 76 on the upstream side of metering restriction 78 is connected through a conduit 98 to a chamber 100 in the pilot valve mechanism 28. The chamber 100 is separated from chamber 24 by a diaphragm 102. The conduit 80 on the downstream side of restriction 78 is connected through a conduit 104 to a chamber 106 in the pilot valve mechanism 28. The chamber 106 is separated by a diaphragm 108 from the chamber 26.

A pilot valve 110 is connected to the center of the diaphragms 102, 27 and 108.

The pilot valve 110 is provided with a pair of recesses 112 and 114 which lie adjacent ports leading to control conduits 116 and 118. The valve 110 is also provided with a series of three lands which, when the valve is in the position shown in the drawing, block, respectively, a port leading through a conduit 120 to the chamber 106, a port leading through a drain conduit 122 to the inlet conduit 30, and a port opening into chamber 106 directly. A spring 124 acts to the right on valve 110, and the force of spring 124 may be adjusted by the use of an adjusting screw 126.

The valve 110 is positioned by three forces: the force of spring 124 acting to the right; the force due to the air measuring pressure differential acting to the left on diaphragm 27; and the force due to the fuel pressure differential across restrictions 78, which acts through diaphragms 102 and 108, and which acts to the left because the higher pressure is in chamber 100.

The spring 124 is so designed with respect to the area of diaphragms 102 and 108 that it applies to the valve 110 equal to the net force which would be applied to diaphragms 102 and 108 by the maximum fuel flow passing through restriction 78. The maximum fuel flow referred to here is the same as the constant value of fuel flow passing through restriction 36. For example, if restrictions 36 and 78 are made to the same size, and the areas of diaphragms 102 and 108 are the same as that of diaphragm 56, then the force of spring 124 will be the same as the force of spring 68. Any desired relationship may be used between the areas of 102 and 108 and the area of diaphragm 56. These relationships must be taken into account in designing the relative strengths of springs 68 and 124.

The area of diaphragm 27 is so chosen with relation to the areas of diaphragms 102 and 108, that each increment of air flow produces a force acting on valve 110 through diaphragm 27 equal to that produced by the increment of fuel flow through restriction 78 which would be required to balance the air flow increment in accordance with a predetermined fuel-air ratio. In other words, the difference between the area of diaphragm 27 and the areas of diaphragms 102 and 108 determines the fuel-air ratio which will be maintained by the system.

The constant force of spring 124 may be considered as a measure of the constant rate of fuel flow through restriction 36. The fuel pressure differential across restriction 78, acting to the left on diaphragms 102 and 108, provides a force which is a measure of the fuel flow through restriction 78. The difference between these two forces acting on valve 110 then may be considered as a measure of the rate of fuel flow to the engine through the conduit 38. This difference is opposed by the air pressure differential acting on diaphragm 27. If the air flow and the fuel flow to the engine have the proper values to maintain the desired fuel-air ratio, then the valve 110 remains in the position shown in the drawing.

If the air flow then increases, the force acting on diaphragm 27 moves valve 110 to the left, thereby opening a flow path for high pressure fuel from conduit 120 through recess 112 to control conduit 116 and the right end of servo-motor cylinder 128. At the same time, a path of flow is opened from left end of cylinder 128 through control conduit 118 and recess 114 to drain conduit 122. A pressure differential is thereby applied to piston 130 of the servo-motor, moving it to the left, and rotating the delivery control arm 132 counterclockwise to increase the fuel injector pump delivery. This increase in the pump delivery increases the flow through conduit 38, and thereby decreases the flow through conduit 76 and restriction 78. This reduces the fuel pressure differential acting to the left on diaphragm 110. The increase in the delivery of the injector pumps continues until the fuel pressure differential across restriction 78 is reduced sufficiently so that valve 110 is returned to its neutral position as shown in the drawing. When that occurs, the fuel flow to the engine will have been increased sufficiently to balance the increase in air flow.

In a similar manner, a decrease in the air flow causes valve 110 to move to the right, thereby causing operation of servo-motor piston 130 to the right to decrease the injector pump delivery. This increases the flow through restriction 78, thereby increasing the fuel pressure differential and restoring valve 110 to its neutral position.

Under idling conditions, the air pressure differential acting to the left on diaphragm 27 may become very small. Even if it does, the valve 110 is still positioned by the balance between two relatively large forces, namely that of the spring 124 and the force due to the pressure differential across the restriction 78.

The pressure regulator 82, in maintaining a constant pressure on the downstream side of restriction 78, serves two purposes. In the first place, by maintaining a positive pressure on the downstream side of that restriction, it prevents vaporization of the fuel passing through that restriction. If the fuel passing through restriction 78 were permitted to drop to the rather low fuel inlet pressure, it might have a tendency to vaporize, because of the magnitude of the pressure drop. In the second place, the regulator 82 maintains a pressure which is sufficiently large so that it may be used as the source of motive fluid for the servo-motor 134.

*Figure 2*

There is illustrated in Figure 2 another form of control system embodying the principles of my invention. In Figure 2, the air flows to the engine through a passage 200, which leads from an entrance 202, past a venturi 204 and a throttle 206 to a discharge outlet 208. The air pressure differential at the venturi is communicated through a pair of conduits 210 and 212 to chambers 214 and 216 in a pilot valve mechanism generally indicated at 218. The chambers 214 and 216 are separated by a diaphragm 220.

Fuel flows to the engine from a tank (not shown) through a conduit 222, an engine driven pump 224, a conduit 226, a metering restriction 228 and a conduit 230 to a set of fuel injector pumps 232. The pumps 232 deliver the fuel directly to the engine cylinders.

A pressure relief conduit 234 leads from the conduit 226 at the upstream side of restriction 228. Fuel entering conduit 234 flows through a restriction 236, a conduit 238, a valve 240, and a conduit 242 to the inlet of pump 224.

An emergency pressure relief conduit extends from the discharge side of pump 224 back to the inlet through a check valve 225. This check valve opens only under conditions of very high discharge pressure to protect the system.

Valve 240 is attached to a stem 244 connected to the piston 246 of a servo-motor generally indicated at 248. The servo-motor 248 is controlled by the pilot valve mechanism 218. The piston 246 moves in a cylinder, which it separates into a pair of expansible chambers 250 and 252. A spring 254 biases the piston 246 downwardly, in a direction to close valve 240. Chambers 250 and 252 are connected through conduits 256 and 258, respectively, with the pilot valve mechanism 218.

The pilot valve mechanism 218 is generally similar in its construction and operation to the pilot valve mechanism 28 of Figure 1. In addition to the elements already described, the pilot valve mechanism 218 includes a chamber 260 separated from chamber 214 by a diaphragm 262 and a chamber 264 separated from chamber 216 by a diaphragm 266. The diaphragms 262, 220 and 266 are connected at their centers to the stem of a pilot valve member 268. The pilot valve member 268 is of the spool valve type, and is provided with recesses 270 and 272 opposite ports leading to the control conduits 256 and 258. The valve member 268 is also provided with lands, which, when the valve is in the position shown in the drawing, block ports leading to a high pressure inlet conduit 274 and drain conduits 276 and 278. A spring 280 acts on the valve 268, biasing it in an upward direction. If required, suitable means may be provided for adjusting the force of the spring 280. Chamber 260 is connected through a conduit 282 to conduit 234 on the upstream side of restriction 236. Chamber 264 is connected through a conduit 284 to conduit 238 on the downstream side of restriction 236.

The delivery of the injector pump 232 is controlled by a servo-motor generally indicated at 286, which includes a piston 288 moving in a cylinder which it separates into two expansible chambers 290 and 292. Chambers 290 and 292 are respectively connected to a pilot valve mechanism 294 through conduits 296 and 298, respectively.

The pilot valve mechanism 294 includes flexible diaphragms 300 and 302, separating three expansible chambers 304, 306 and 308. The diaphragm 300 is made to have twice the area of diaphragm 302, for reasons to be explained hereinafter. Chamber 304 is connected through a conduit 310 to the conduit 226 on the upstream side of restriction 228. Chamber 306 is connected through a conduit 312 to the conduit 238 on the downstream side of restriction 236. Chamber 308 is connected through a conduit 314 to the conduit 230 on the downstream side of restriction 228. The diaphragms 300 and 302 are attached at their centers to the stem of a valve 316.

Valve 316 is of the spool type, and is provided with a pair of recesses 320 and 322, located opposite ports leading to the control conduits 296 and 298. The valve 316 is also provided with lands which, when the valve is in the position shown in the drawing, block ports leading through a fluid pressure supply conduit 324 and drain conduits 326 and 328.

Any suitable source of hydraulic fluid under pressure may be provided for the conduits 274 and 324. It may be either the engine pressure, a special source of hydraulic fluid, or the fuel itself from the discharge of pump 224 or other suitable source.

The pressure in chamber 304 is the same as the pressure on the upstream side of restriction 228, which is substantially the same as the pressure on the upstream side of restriction 236. The pressure in chamber 306 is the same as that on the downstream side of restriction 236. This pressure acts upwardly on diaphragm 300 and downwardly on diaphragm 302. Since diaphragm 302 has an effective area equal to one-half that of diaphragm 300, it may be seen that the pressure in chamber 306 acts upwardly on an area equal to one-half that of diaphragm 300. Similarly, the pressure in chamber 308, which is that on the downstream side of restriction 228, acts upwardly on an area equal to one-half that of diaphragm 300.

It may therefore be seen that the valve 316 is moved downwardly with a force equal to the sum of the fuel pressure differential across restriction 236 and the fuel pressure differential across restriction 228. This assumes that restrictions 228 and 236 are the same size. They may be made of different sizes, in which case this factor should be taken into consideration in designing the relative areas of diaphragms 300 and 302. The force acting downwardly on valve 316 is a measure of the total fuel discharged by pump 224. This force is opposed by spring 318, which therefore sets the total rate of discharge of fuel by pump 224.

The pilot valve mechanism 294 controls the delivery of the injector pump 232 so as to maintain the total fuel discharged by transfer pump 224 constant. As long as the total fuel discharge remains constant, the valve 316 remains in the position shown, and therefore there is no movement of the injector pump delivery control arm. If, under such conditions, either the fuel flow through the restriction 236 or the fuel flow through restriction 228 increases, the valve 316 is moved downwardly, opening a path of flow for high pressure fluid from conduit 324 through recess 320 and conduit 396 to chamber 290 of the servo-motor 286. At the same time, a path of flow is opened from chamber 292 through conduit 298 and recess 322 to drain conduit 328. The pressure differential therefore moves piston 228 to the right, thereby decreasing the injector pump delivery, and decreasing the fuel flow through restriction 228 until it has decreased sufficiently to restore the balance of the pilot valve mechanism 294.

The spring 280 of pilot valve mechanism 218, like the spring 124 of pilot valve mechanism 28 of Figure 1, is a measure of the maximum rate of fuel flow to the engine. This is opposed by an air pressure differential, which is a measure of the rate of air flow to the engine, and by the fuel pressure differential across restriction 236, which is a measure of the rate of fuel flow through the by-pass conduit. The difference between the upward force of spring 280 and the downward force due to the fuel pressure differential acting in chambers 260 and 264 of the pilot valve mechanism, may be considered to be a measure of the fuel flow through the restriction 228. If the air pressure differential, acting on diaphragm 220, exactly balances that difference, then the valve 268 remains in the position shown in the drawing.

If the air flow then is increased, the valve 268 is moved downwardly, opening a path of flow for high pressure fluid from conduit 274 through recess 270 and conduit 256 to the chamber 250 of servo-motor 248. At the same time, chamber 252 is connected through conduit 258 and recess 272 to the drain conduit 278. The valve 240 is therefore moved toward closed position, decreasing the flow through restriction 236 to restore the balanced condition of valve 268. The decreased flow through restriction 236 causes a response of pilot valve mechanism 294 to increase the flow to the injector pump so as to maintain the same total fuel discharged from the transfer pump, and so as to restore the fuel-air ratio determined by the relative sizes of diaphragm 220 and diaphragms 262 and 266.

Therefore the valve 268 of the pilot valve mechanism 218 and the valve 316 of mechanism 294 are always positioned by the balance between two large, readily measurable forces even when the air pressure differential acting on diaphragm 220 is nearly zero, as under idling conditions. Also, the opposing forces acting on the pilot valve mechanism 294 are also large and easily measurable under all conditions.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim as my invention:

1. Control apparatus for an internal combustion engine, comprising means for measuring the rate of combustion air flow to said engine, a fuel pump, means for regulating the rate of discharge of fuel from said pump at a constant value sufficient to give a predetermined fuel-air ratio at the maximum rate of air flow, first fuel conduit means for conveying fuel from said pump to said engine, second fuel conduit means for conveying fuel from the outlet to the inlet of said pump, means for measuring the rate of flow of fuel thru said second conduit means, and means including both said measuring means for controlling the flow of fuel thru one of said conduit means so that the sum of the air flow measurement and the fuel flow measurement equals said constant value.

2. Control apparatus for an internal combustion engine, comprising means for measuring the rate of combustion air flow to said engine and for producing an air measuring force varying directly as a predetermined function of said rate of air flow, a fuel pump, first fuel conduit means for conveying fuel from said pump to said engine, second fuel conduit means for conveying fuel from the outlet to the inlet of said pump, means for measuring the rate of flow of fuel thru said second conduit means and for producing a fuel measuring force varying directly as a second predetermined function of said rate of fuel flow, said first and second functions being so related that each increment of air flow produces a force equal to that produced by the increment of fuel flow required to balance said air flow increment in accordance with a predetermined fuel-air ratio, means for producing a substantially constant force corresponding to the value of said air flow measuring force at maximum air flow, a control device subject to said constant force acting in one direction and to said air measuring force and said fuel measuring force acting in the opposite direction, means including said control device for regulating the flow thru one of said fuel conduit means to maintain the balance of forces on said control device, and means responsive to the total flow thru both said fuel conduit means for regulating said total flow at a constant value sufficient to maintain said fuel-air ratio at said maximum air flow.

3. Control apparatus for an internal combustion engine, comprising means for measuring the rate of combustion air flow to said engine and for producing an air measuring force varying directly as a predetermined function of said rate of air flow, a fuel pump, first fuel conduit means for conveying fuel from said pump to said engine, second fuel conduit means for conveying fuel from the outlet to the inlet of said pump, means for measuring the rate of flow of fuel thru said second conduit means and for producing a fuel measuring force varying directly as a second predetermined function of said rate of fuel flow, said first and second functions being so related that each increment of air flow produces a force equal to that produced by the increment of fuel flow required to balance said air flow increment in accordance with a predetermined fuel-air ratio, means for producing a substantially constant force corresponding to the value of said air flow measuring force at maximum air flow, a control device subject to said constant force acting in one direction and to said air measuring force and said fuel measuring force acting in the opposite direction, means including said control device for regulating the flow thru said first fuel conduit means to maintain the balance of forces on said control device, and means responsive to the total fuel flow thru both said fuel conduit means for regulating said total flow at a constant value sufficient to maintain said fuel-air ratio at said maximum air flow.

4. Control apparatus for an internal combustion engine, comprising means for measuring the rate of combustion air flow to said engine and for producing an air measuring force varying directly as a predetermined function of said rate of air flow, a fuel pump, first fuel conduit means for conveying fuel from said pump to said engine, second fuel conduit means for conveying fuel from the outlet to the inlet of said pump, means for measuring the rate of flow of fuel thru said second conduit means and for producing a fuel measuring force varying directly as a second predetermined function of said rate of fuel flow, said first and second function being so related that each increment of air flow produces a force equal to that produced by the increment of fuel flow required to balance said air flow increment in accordance with a predetermined fuel-air ratio, means for producing a substantially constant force corresponding to the value of said air flow measuring force at maximum air flow, a control device subject to said constant force acting in one direction and to said air measuring force and said fuel measuring force acting in the opposite direction, means including said control device for regulating the flow thru said second fuel conduit means to maintain the balance of forces on said control device, and means responsive to the sum of the fuel flows thru both said fuel conduit means for regulating the flow thru said first fuel conduit means.

5. Control apparatus for an internal combustion engine, comprising means for measuring the rate of combustion air flow to said engine and for producing an air measuring force varying directly as a predetermined function of said rate of air flow, a fuel pump, a first fuel conduit for conveying fuel from said pump to said engine, a first metering restriction in said first conduit, a second fuel conduit for conveying fuel from the downstream side of said restriction to the inlet of said pump, means including a second metering restriction in said second conduit for measuring the rate of flow of fuel thru said second conduit and for producing a fuel measuring force varying directly as a second predetermined function of said rate of fuel flow, said first and second functions being so related that each increment of air flow produces a force equal to that produced by the increment of fuel flow required to balance said air flow increment in accordance with a predetermined fuel-air ratio, means for producing a substantially constant force corresponding to the value of said air flow measuring force at maximum air flow, a control device subject to said constant force acting in one direction and to said air measuring force and said fuel measuring force acting in the opposite direction, means including said control device for regulating the flow thru said first fuel conduit to maintain the balance of forces on said control device, a third conduit for conveying fuel from the upstream side of said first restriction to the inlet of said pump, and means responsive to the fuel pressure differential across said first restriction for regulating the flow thru said third fuel conduit to maintain the flow thru said first restriction at a constant value sufficient to maintain said fuel-air ratio at said maximum air flow.

6. Control apparatus for an internal combustion engine, comprising means for measuring the rate of combustion air flow to said engine and for producing an air measuring force varying directly as a predetermined function of said rate of air flow, a fuel pump, a first fuel conduit for conveying fuel from said pump to said engine, a first metering restriction in said first conduit, a second fuel conduit for conveying fuel from the outlet to the inlet of said pump, means including a second metering restriction in said second conduit for measuring the rate of flow of fuel thru said second conduit and for producing a fuel measuring force varying directly as a second predetermined function of said rate of fuel flow, said first and second functions being so related that each increment of air flow produces a force equal to that produced by the increment of fuel flow required to balance said air flow increment in accordance with a predetermined fuel-air ratio, means for producing a substantially constant force corresponding to the value of said air flow measuring force at maximum air flow, a control device subject to said constant force acting in one direction and to said air measuring force and said fuel measuring force acting in the opposite direction, means including said control device for regulating the flow thru said second fuel conduit to maintain the balance of forces on said control device, and means responsive to the sum of the fuel pressure differentials across both said metering restrictions for regulating the flow thru the other of said fuel conduit means to maintain the sum of the fuel flows thru said first and second conduits at a constant value sufficient to maintain said fuel-air ratio at said maximum air flow.

7. Control apparatus for an internal combustion engine, comprising means for measuring the rate of combustion air flow to said engine and for producing an air pressure differential varying directly as said rate of air flow, a fuel pump, first fuel conduit means for conveying fuel from said pump to said engine, second fuel conduit means for conveying fuel from the outlet to the inlet of said pump, means for measuring the rate of flow of fuel thru said second conduit means and for producing a fuel pressure differential varying directly as said rate of fuel flow, first diaphragm means subject to said air pressure differential, second diaphragm means subject to said fuel pressure differential, spring means for producing a substantially constant force corresponding to the value of said air flow measuring force at maximum air flow, a control valve subject to said spring means acting in one direction and to both said diaphragm means acting in the opposite direction, means including said control valve for regulating the flow thru one of said fuel conduit means to maintain the balance of forces on said control device, and means responsive to the total flow thru both said fuel conduit means for regulating said total flow at a constant value sufficient to maintain said fuel-air ratio at said maximum air flow.

8. Control apparatus for an internal combustion engine, comprising means for measuring the rate of combustion air flow to said engine and for producing an air measuring force varying directly as said rate of air flow, a fuel pump, first fuel conduit means for conveying fuel from said pump to said engine, second fuel conduit means for conveying fuel from the outlet to the inlet of said pump, means for measuring the rate of flow of fuel thru said second conduit means and for producing a fuel measuring force varying directly as said rate of fuel flow, means for producing a substantially constant force corresponding to the value of said air flow measuring force at maximum air flow, a control device subject to said constant force acting in one direction and to said air measuring force and said fuel measuring force acting in the opposite direction, means including said control device for regulating the flow thru one of said fuel conduit means to maintain the balance of forces on said control device, and means responsive to the total flow thru both said fuel conduit means for regulating said total flow at a constant value sufficient to maintain a predetermined fuel-air ratio at said maximum air flow.

9. Control apparatus for an internal combustion engine, comprising means for measuring the rate of combustion air flow to said engine and for producing an air measuring force varying directly as a predetermined function of said rate of air flow, a fuel pump, first fuel conduit means for conveying fuel from said pump to said engine, second fuel conduit means for conveying fuel from the outlet to the inlet of said pump, means for measuring the rate of flow of fuel thru said second conduit means and for producing a fuel measuring force varying directly as a second predetermined function of said rate of fuel flow, said first and second functions being so related that each increment of air flow produces a force equal to that produced by the increment of fuel flow required to balance said air flow increment in accordance with a predetermined fuel-air ratio, means for producing a substantially constant force corresponding to the value of said air flow measuring force at maximum air flow, a control device subject to said constant force acting in one direction and to said air measuring force and said fuel measuring force acting in the opposite direction, first control means including said control device, second control means responsive to the total flow thru both said fuel conduit means, and means including one of said control means for regulating the flow thru said first fuel conduit means, and means including the other of said control means for regulating the flow thru said second conduit means.

10. Control apparatus for an internal combustion engine, comprising means for measuring the rate of combustion air flow to said engine and for producing an air measuring force varying directly as said rate of air flow, a fuel transfer pump, fuel injection pump mechanism for delivering fuel to said engine, a first fuel conduit means for conveying fuel from said transfer pump to said injection pump mechanism, means for varying the delivery of said injection pump mechanism, second fuel conduit means for conveying fuel from the outlet to the inlet of said transfer pump, means for measuring the rate of flow of fuel thru said second conduit means and for producing a fuel measuring force varying directly as said rate of fuel flow, means for producing a substantially constant force corresponding to the value of said air flow measuring force at maximum air flow, a control device subject to said constant force acting in one direction and to said air measuring force and said fuel measuring force acting in the opposite direction, first control means including said control device, second control means responsive to the total flow thru both said fuel conduit means, and means including one of said control means for regulating the flow thru said second fuel conduit means, and means including the other of said control means for regulating said injector pump delivery mechanism.

LEIGHTON LEE, II.